(12) United States Patent  
Zhang et al.

(10) Patent No.: US 7,120,113 B1
(45) Date of Patent: Oct. 10, 2006

(54) SYSTEMS AND METHODS FOR LIMITING LOW PRIORITY TRAFFIC FROM BLOCKING HIGH PRIORITY TRAFFIC

(75) Inventors: Song Zhang, San Jose, CA (US); Jorge Cruz-Rios, Los Altos, CA (US); Anurag P. Gupta, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 966 days.

(21) Appl. No.: 09/905,068

(22) Filed: Jul. 16, 2001

(51) Int. Cl.
  *G08C 15/00* (2006.01)
  *H04J 3/14* (2006.01)
  *H04L 1/00* (2006.01)
  *H04L 12/26* (2006.01)
  *H04L 12/28* (2006.01)
  *H04L 12/56* (2006.01)

(52) U.S. Cl. ..................... 370/229; 370/412
(58) Field of Classification Search .............. 370/412, 370/428, 468, 395.4, 230, 235, 235.1, 229
See application file for complete search history.

(56) References Cited

U.S. PATENT DOCUMENTS

| | | | | |
|---|---|---|---|---|
| 5,850,399 | A | * | 12/1998 | Ganmukhi et al. ......... 370/412 |
| 5,892,766 | A | * | 4/1999 | Wicki et al. ................ 370/412 |
| 6,101,193 | A | * | 8/2000 | Ohba ......................... 370/429 |
| 6,205,150 | B1 | * | 3/2001 | Ruszczyk ................... 370/412 |
| 6,523,098 | B1 | * | 2/2003 | Anderson .................... 711/158 |
| 6,738,386 | B1 | * | 5/2004 | Holmqvist .................. 370/412 |
| 6,856,628 | B1 | * | 2/2005 | Bychowsky et al. ........ 370/412 |
| 2001/0021174 | A1 | * | 9/2001 | Luijten et al. .............. 370/229 |
| 2003/0021230 | A1 | * | 1/2003 | Kuo et al. ................... 370/230 |
| 2004/0179535 | A1 | * | 9/2004 | Bertagna ............... 370/395.21 |

* cited by examiner

*Primary Examiner*—Kevin C. Harper
(74) *Attorney, Agent, or Firm*—Harrity Snyder, LLP

(57) ABSTRACT

A method for processing high priority packets and low priority packets in a network device includes performing arbitration on high priority packets until no high priority packets remain. Arbitration then is enabled on low priority packets. A packet size associated with the selected low priority packet is compared with a programmable threshold. Low priority packets are excluded from subsequent arbitration for a programmable duration when the packet size exceeds the programmable threshold.

17 Claims, 10 Drawing Sheets

SYSTEMS AND METHODS FOR LIMITING LOW PRIORITY TRAFFIC FROM BLOCKING HIGH PRIORITY TRAFFIC

BACKGROUND OF THE INVENTION

1. Field of the Invention

The present invention relates generally to data flow control systems and, more particularly, to traffic flow control systems and methods.

2. Description of Related Art

Conventional network devices relay data units, such as packets, through a network from a source to a destination. Typically, a network device buffers the data units, for example in queues, and includes one or more arbitration subsystems to control data unit flow into and out of the queue.

Conventional arbitration subsystems often operate on a per-queue basis, and therefore do not take into account the unique characteristics of the traffic. Thus, certain types of traffic may block other types of traffic. For example, low priority traffic may continue to be sent to a processor, blocking high priority traffic before a flow controller can stop the flow of such low priority traffic.

Therefore, there exists a need for systems and methods for arbitrating traffic that minimizes traffic blocking.

SUMMARY OF THE INVENTION

Systems and methods consistent with the present invention minimize traffic blocking. One aspect of principles of the invention involves checking a size of a low priority data unit when the low priority packet has been selected for processing by a processor. If the low priority packet is larger than a programmable threshold, the network device may not select any more low priority packets for a programmable duration.

In accordance with one purpose of the invention as embodied and broadly described herein, a system for processing high priority packets and low priority packets in a network device includes a plurality of high priority queues configured to store data unit information and a plurality of low priority queues configured to store data unit information. An arbiter is configured to selectively bypass a low priority queue based on a size of a data unit in the low priority queue.

In another implementation consistent with the principles of the invention, a method for processing high priority packets and low priority packets in a network device includes selecting high priority data units. Low priority data units are selected if no high priority data units can be selected. A size of the selected low priority data units is compared with a threshold In a further implementation consistent with the principles of the invention, a system for managing data flow in a network device includes a plurality of high priority queues configured to store notifications corresponding to the high priority packets and a plurality of low priority queues configured to store notifications corresponding to the low priority packets. A high priority arbiter is configured to perform arbitration on the plurality of high priority queues and to select a notification. A low priority arbiter is configured to perform arbitration on the plurality of low priority queues and to select a notification when no notifications are present in the plurality of high priority queues. Circuitry is configured to compare a data unit size associated with the selected notification with a threshold, and to remove the low priority queue that contained the selected notification from further arbitration for a programmable duration when the data unit size exceeds the threshold. Also, a processor is configured to receive the selected notifications and to assemble output data based on the selected notifications.

In yet another implementation consistent with the present invention, a method for processing high priority data units and low priority data units in a network device includes performing arbitration on high priority notifications that correspond to the high priority data units and outputting selected high priority notifications to a processor until no high priority notifications remain. Arbitration may be enabled on low priority notifications that correspond to the low priority data units, and arbitration on the low priority notifications may be performed. A selected low priority notification is output to the processor, and a data unit size associated with the selected low priority notification is compared with a threshold. A queue that contained the selected low priority notification is excluded from subsequent arbitration on the low priority notifications for a duration when the packet size exceeds the threshold.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention provide an arbitration process to avoid the blocking of high priority data by low priority data in a network device. The network device checks a size of a low priority data unit when the low priority data unit is dequeued for processing by a processor. If the low priority data unit is larger than a programmable threshold, the network device may not dequeue any more low priority for a programmable duration. The programmable threshold may depend, for example, on a processing rate of the processor, and the programmable duration may depend on a latency of a flow control device for the processor.

Exemplary Network Device Configuration

Figure 1:
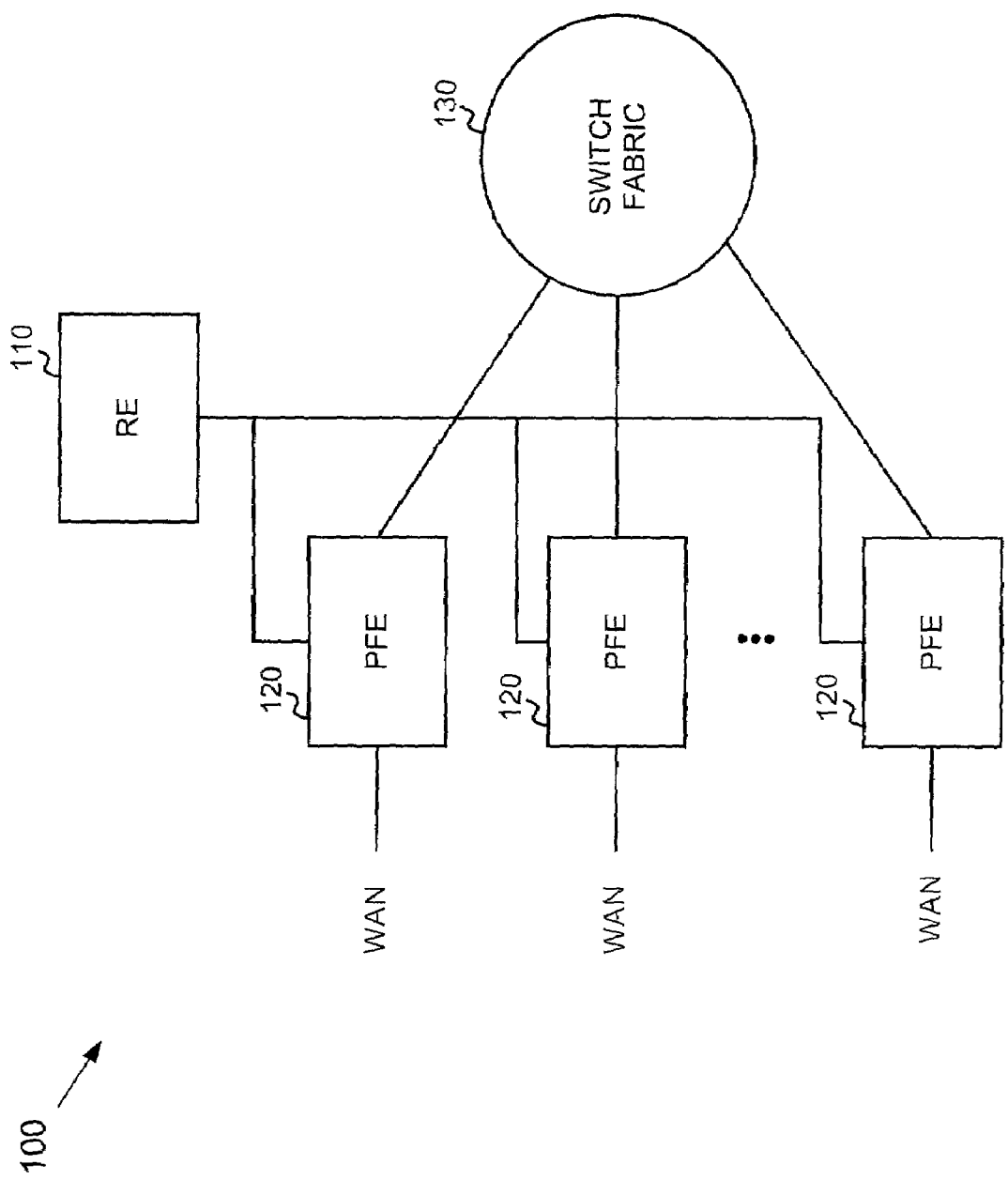
FIG. 1 is a diagram of an exemplary network device in which systems and methods consistent with the principles of invention may be implemented.

FIG. 1 is a diagram of an exemplary network device in which systems and methods consistent with the present invention may be implemented. The principles of the invention will be described in terms of packets, but the principles apply to flow of any type of data unit. In this particular implementation, the network device takes the form of a router 100. The router 100 may receive one or more data streams from a physical link, process the data stream(s) to determine destination information, and transmit the data stream(s) on one or more links in accordance with the destination information.

The router 100 may include a routing engine (RE) 110 and multiple packet forwarding engines (PFEs) 120 interconnected via a switch fabric 130. The switch fabric 130 may include one or more switching planes to facilitate communication between two or more of the PFEs 120. In an implementation consistent with the present invention, each of the switching planes includes a three-stage switch of crossbar elements.

The routing engine 110 may include processing logic that performs high level management functions for router 100. For example, the routing engine 110 may communicate with other networks and systems connected to router 100 to exchange information regarding network topology. The routing engine 110 may create routing tables based on the network topology information and forward the routing tables to PFEs 120. The PFEs 120 may use the routing tables to perform route lookup for incoming packets. The routing engine 110 may also perform other general control and monitoring functions for router 100.

Each of the PFEs 120 connects to the routing engine 110 and the switch fabric 130. The PFEs 120 receive data on physical links connected to a network, such as a wide area network (WAN). Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet.

Figure 2:
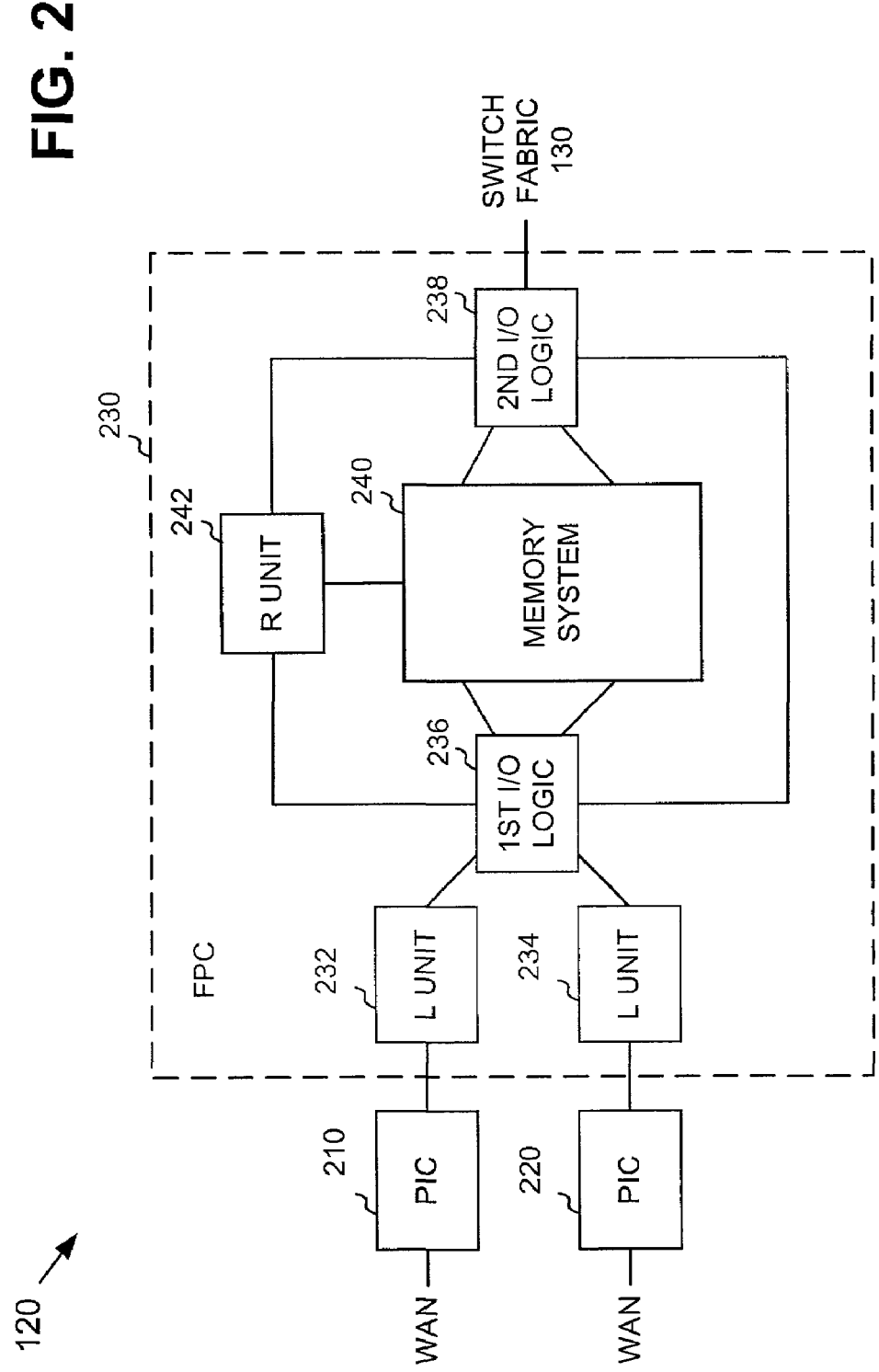
FIG. 2 is an exemplary diagram of a packet forwarding engine (PFE) of FIG. 1 according to an implementation consistent with the principles of invention.

FIG. 2 is an exemplary diagram of a PFE 120 according to an implementation consistent with the present invention. The PFE 120 may include physical interface cards (PICs) 210 and 220 connected to a flexible port concentrator (FPC) 230. While two PICs 210 and 220 are shown in FIG. 2, there may be more or less PICs in other implementations consistent with the present invention.

The PICs 210 and 220 connect to WAN physical links and the FPC 230 and transport data between the WAN and the FPC 230. Each of the PICs 210 and 220 includes interfacing, processing, and memory elements necessary to transmit data between a WAN physical link and the FPC 230. Each of the PICs 210 and 220 may be designed to handle a particular type of physical link. For example, a particular PIC may be provided to handle only Ethernet communications.

For incoming data, the PICs 210 and 220 may strip off the layer 1 (L1) protocol information and forward the remaining data (raw packets) to the FPC 230. For outgoing data, the PICs 210 and 220 may receive packets from the FPC 230, encapsulate the packets in L1 protocol information, and transmit the data on the physical WAN link.

The FPC 230 performs packet transfers between PICs 210 and 220 and the switch fabric 130. For each packet it handles, the FPC 230 may perform route lookup based on packet header information to determine destination information and send the packet either to PIC 210 and 220 or switch fabric 130, depending on the destination information.

The FPC 230 may include L units 232 and 234, first input/output (I/O) logic 236, second input/output (I/O) logic 238, memory system 240, and R unit 242. Each of the L units 232 and 234 corresponds to one of the PICs 210 and 220. The L units 232 and 234 may process packet data flowing between the PICs 210 and 220, respectively, and the first I/O logic 236. Each of the L units 232 and 234 may operate in two modes: a first mode for processing packet data received from the PIC 210 or 220 connected to it, and a second mode for processing packet data received from the first I/O logic 236.

In the first mode, the L unit 232 or 234 may process packets from PIC 210 or 220, respectively, convert the packets into data (D) cells, and transmit the D cells to the first I/O logic 236. D cells are the data structure used internally by FPC 230 for transporting and storing data. In one implementation, D cells are 64 bytes in length.

Packets received by the L unit 232 or 234 may include two portions: a header portion and a packet data portion. For each packet, the L unit 232 or 234 may process the header and insert the header and processing results into the D cells. For example, the L unit 232 or 234 may parse layer 2 (L2) and layer 3 (L3) headers of incoming packets. The L unit 232 or 234 may also create control information based on the packet. The control information may be based on the packet header, the packet data, or both. The L unit 232 or 234 may then store the parsed headers, control information, and the packet data in D cells, which it sends to the first I/O logic 236.

In the second mode, the L unit 232 or 234 handles data flow in the opposite direction to the first mode. In the second mode, the L unit 232 or 234 receives D cells from the first I/O logic 236, extracts the header information, control information, and packet data from the D cells, and creates a packet based on the extracted information. The L unit 232 or 234 creates the packet header from the header information and possibly the control information from the D cells. In one implementation, the L unit 232 or 234 creates L2 and L3 header information based on the header information and control information. The L unit 232 or 234 may load the packet data portion with the packet data from the D cells.

The first I/O logic 236 and second I/O logic 238 coordinate data transfers into and out of the FPC 230. First I/O logic 236 and record I/O logic 238 also create notifications based on the header information and control information in the D cells.

While the first I/O logic 236 and the second I/O logic 238 are shown as separate units, they may be implemented as a single unit in other implementations consistent with the present invention. The R unit 242 receives notifications from the first I/O logic 236 and second I/O logic 238. The R unit 242 may include processing logic that provides route lookup, accounting, and policing functionality. The R unit 242 may receive one or more routing tables from the routing engine 110 (FIG. 1) and use the routing table(s) to perform route lookups based on the notifications. The R unit 242 may insert the lookup result into the notification, which it forwards to memory system 240.

Figure 3:
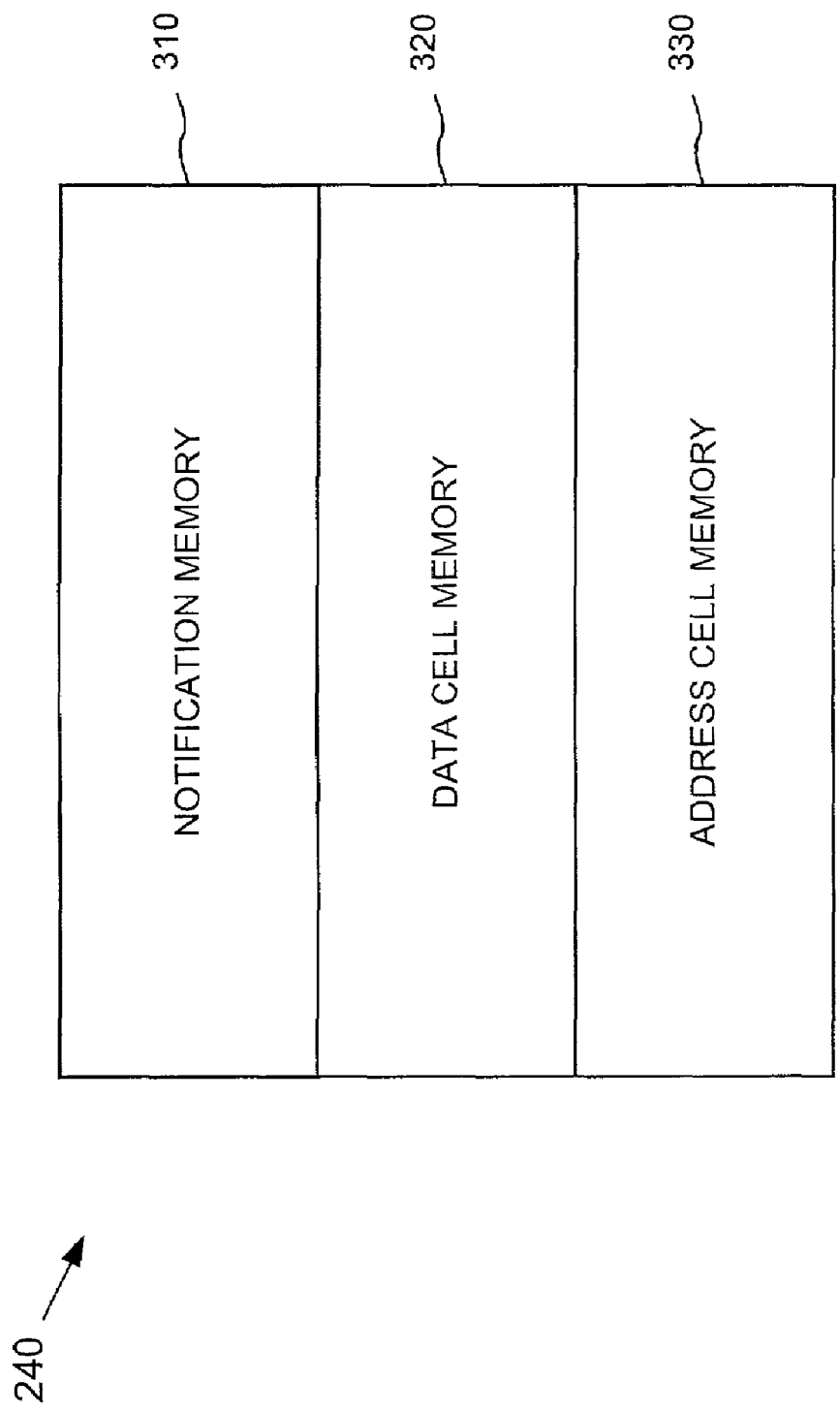
FIG. 3 is an exemplary diagram of the memory of FIG. 2 according to an implementation consistent with the principles of invention.

The memory system 240 may temporarily store D cells from the first I/O logic 236 and second I/O logic 238 and notifications from the R unit 242. FIG. 3 is an exemplary diagram of storage areas of the memory system 240 according to an implementation consistent with the present invention. The memory system 240 may be implemented as one or more memory devices and may include a notification memory 310, a data cell memory 320, and an address cell memory 330. In an implementation consistent with the present invention, the data cells of a packet are stored at non-contiguous locations within the data cell memory 320. Although illustrated as contiguous areas, the three types of data may also be mixed. Memory system 240 also includes memory management elements (not shown) for managing notification memory 310, data cell memory 320, and address cell memory 330.

Figure 4:
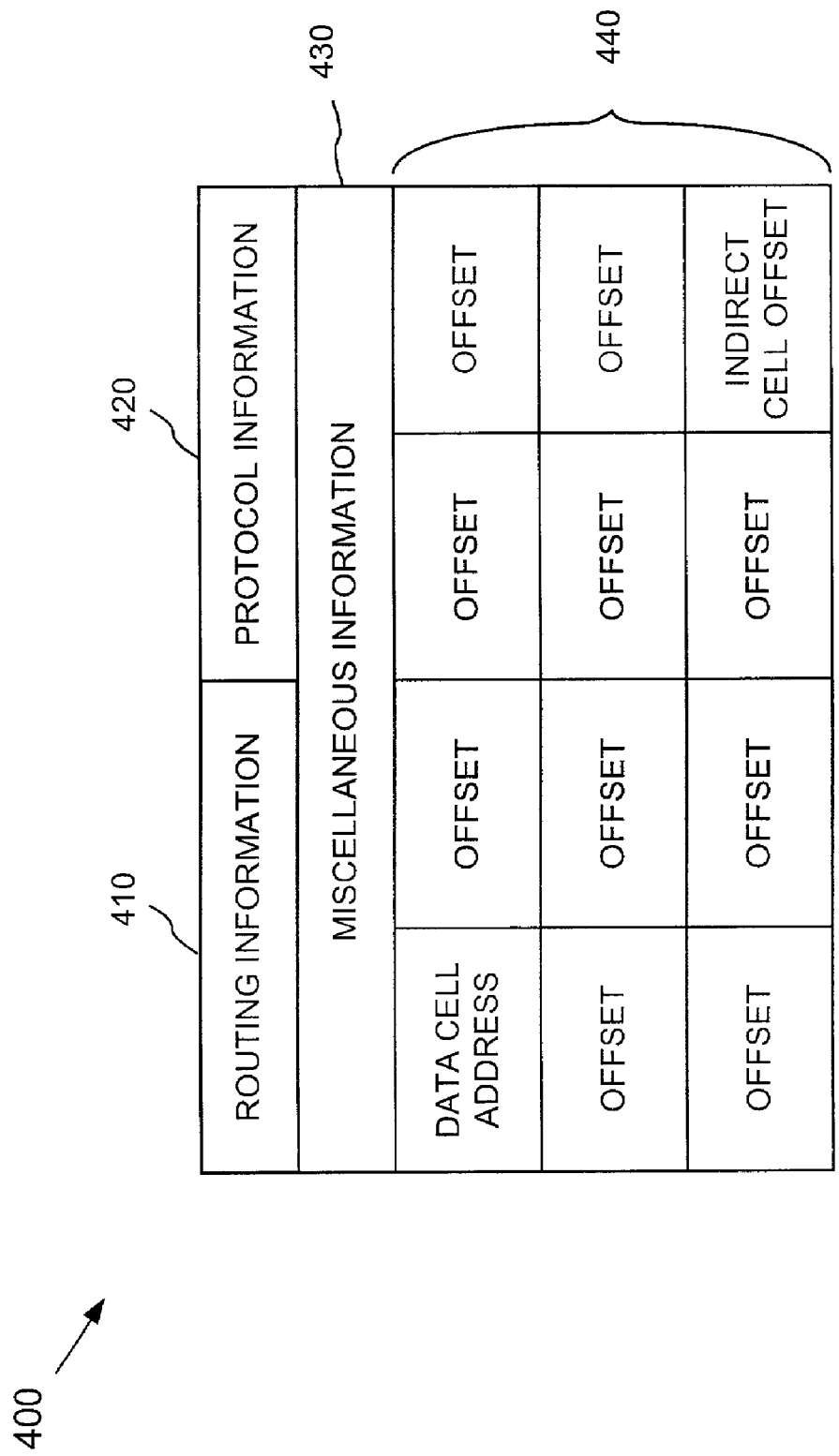
FIG. 4 is an exemplary diagram of a notification according to an implementation consistent with the principles of invention.

The notification memory 310 may store notifications from the R unit 242. FIG. 4 is an exemplary diagram of a notification 400 according to an implementation consistent with the present invention. The notification 400 may include several fields, such as a routing information field 410, a protocol information field 420, miscellaneous information field 430, and address fields 440. The routing information field 410 may store information regarding a source, destination, input and output PICs, etc. of a packet. The protocol information field 420 may store information regarding the protocol associated with the packet. The miscellaneous information field 430 may store other packet-related information, such as quality of service (QoS), validity, priority, and length data.

The address fields 440 store pointers to data cells stored in the data cell memory 320. In an implementation consistent with the present invention, the first data cell address field stores an actual address of a data cell in the data cell memory 320. The other data cell address fields store data that identify the addresses of other data cells in the data cell memory 320 based on their relationship to the actual address, or as offsets from the first data cell address. If there are more offsets than notification 400 can store, the final address field is used as an offset to an indirect cell. The indirect cell contains additional offsets, and may in turn contain an offset to another indirect cell, thus allowing a linked list of indirect cells carrying offsets.

Figure 5:
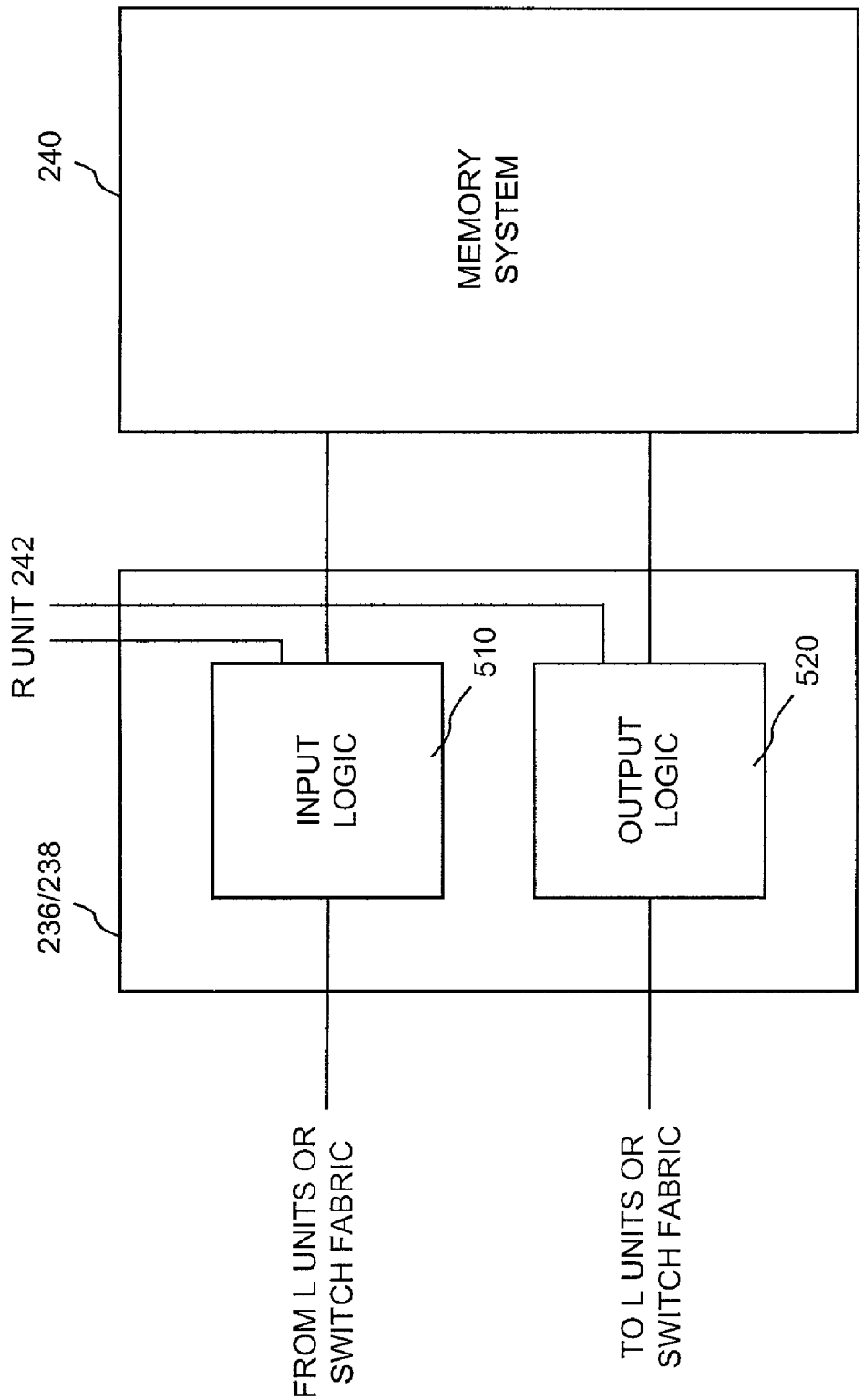
FIG. 5 is an exemplary diagram of the I/O units of FIG. 2 according to an implementation consistent with the principles of invention.

FIG. 5 is an exemplary diagram of the first I/O logic 236 and second I/O logic 238 according to an implementation consistent with the present invention. Each of the logic 236 and 238 includes input logic 510 and output logic 520. The input logic 510 receives data from the L units 232 or 234 or from the switch fabric 130 and writes the data to the memory system 240. More particularly, the input logic 510 may extract information from the D cells to form a notification, write the D cells to the memory system 240, store the address information in the notification identifying where the D cells were stored, and send the notification to the R unit 242.

The output logic 520 handles data transfer in the direction opposite to the input logic 510. Generally, the output logic 520 receives notifications from the memory system 240, reads D cells from the memory system 240, updates certain information in the D cells based on the notification, and transfers the D cells to the L units 232 and 234. Alternatively, the output logic 520 may transfer the D cells to switch fabric 130.

Figure 6:
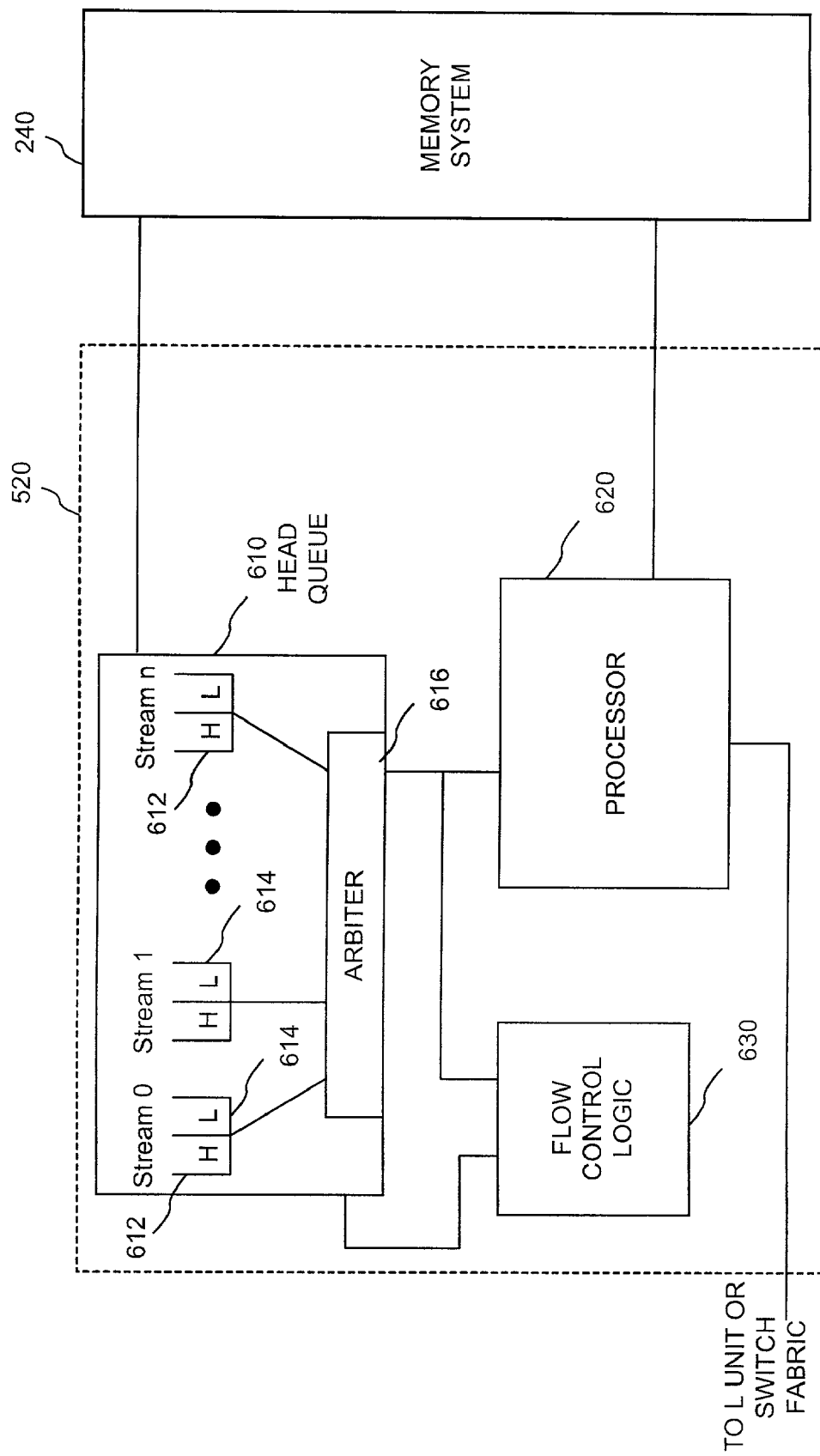
FIG. 6 is an exemplary diagram of the output logic of FIG. 5 according to an implementation consistent with the principles of invention.

FIG. 6 is an exemplary diagram of the output logic 520 according to an implementation consistent with the principles of the present invention. The output logic 520 may include a head queue 610, a processor 620, and flow control logic 630. The head queue 610 may include n high priority queues 612, n low priority queues 614, and an arbiter 616. The head queue 610 may receive notifications 400 from the memory system 240. Each notification 400 corresponds to one or more of n streams. According to one implementation consistent with the present invention, n may equal 144; however, other implementations consistent with principles of the invention may use other values of n. Each notification may be stored in one of queues 612/614 associated with a stream, with high priority notifications being stored in high priority queue 612 and low priority notifications being stored in low priority queue 614. In one implementation consistent with principles of the invention, the queues 612/614 may include first-in, first-out (FIFO) buffers that contain pointers to the notifications. Under such a scheme, the notifications may be stored in a buffer (not shown). Alternately, the queues 612/614 may contain the actual notifications.

Figure 7:
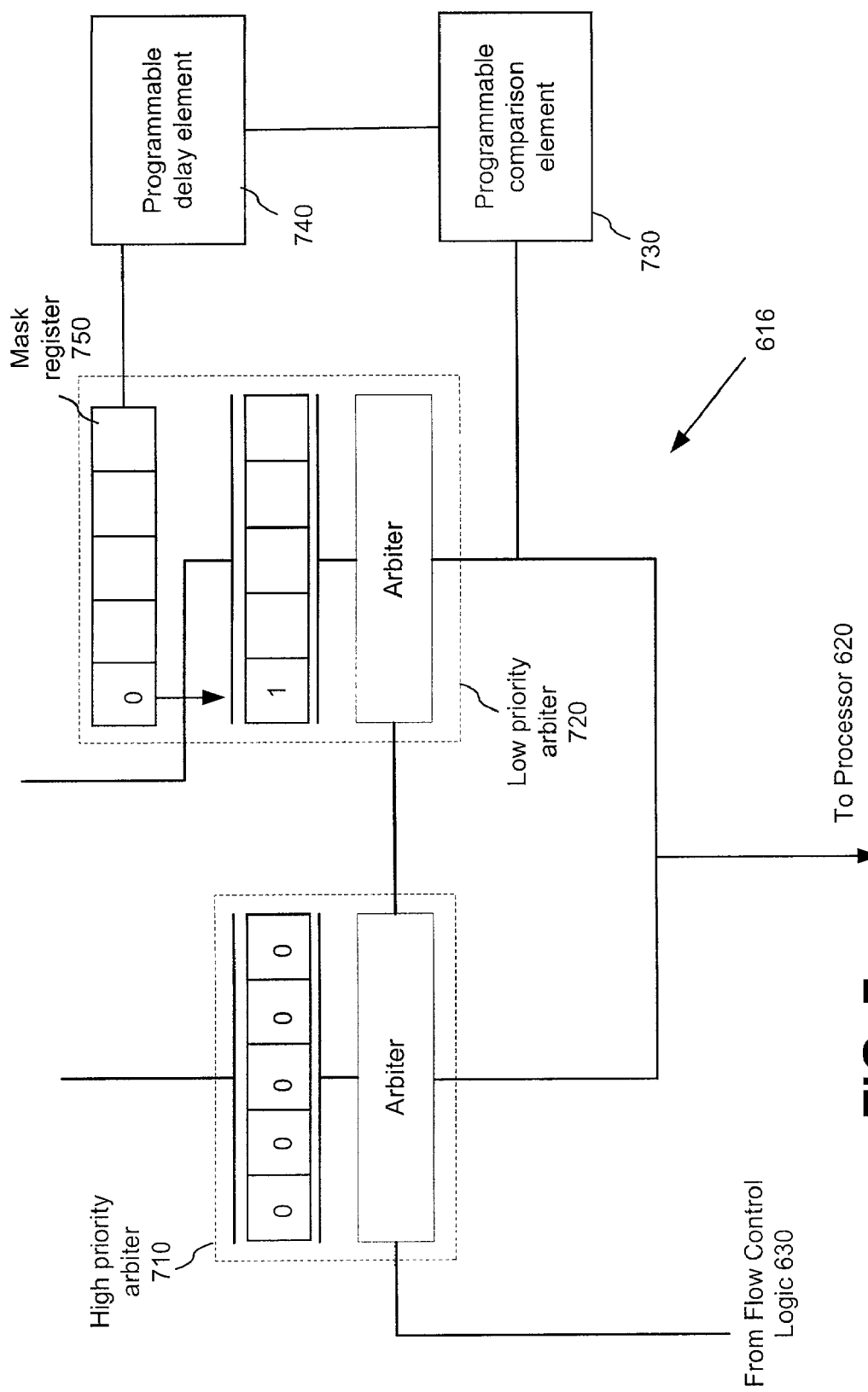
FIG. 7 is an exemplary diagram of the arbiter of FIG. 6 according to an implementation consistent with the principles of invention.

The arbiter 616 may be configured to arbitrate among the n queues 612/614, and to pass a selected notification to the processor 620 and the flow control logic 630. An exemplary configuration of the arbiter 616 according to an implementation consistent with the present invention is shown in FIG. 7. The arbiter 616 may include a high priority arbiter 710, a low priority arbiter 720, a programmable comparison element 730, a programmable delay element 740, and a mask register 750.

The high priority arbiter 710 may include a round-robin arbiter that receives a binary input from each of the n high priority queues 612. A binary "1," for example, indicates that the corresponding high priority queue 612 contains a notification to be processed by the processor 620, while a binary "0" indicates that no notifications are present in the corresponding high priority queue. The high priority arbiter 710 may be selectively enabled or disabled by a flow control signal from the flow control logic 630. The high priority arbiter 710 may be configured to, if enabled by the flow control signal, perform round-robin arbitration among the high priority queues 612 in a conventional manner. The high priority arbiter 710 may cause the selected high priority queue 612 to dequeue a high priority notification to the processor 620. If there are no notifications in any of the high priority queues 612 (e.g., all high priority queues send "0"), the high priority arbiter 710 may be configured to enable the low priority arbiter 720, for example using an enable signal.

The low priority arbiter 720 may include a round-robin arbiter that receives a binary input from each of the n low priority queues 614. A binary "1," for example, indicates that the corresponding low priority queue 614 contains a notification to be processed by the processor 630, while a binary "0" indicates that no notifications are present in the corresponding low priority queue. The low priority arbiter 720 may be selectively enabled or disabled by the enable signal from the high priority arbiter 710. The low priority arbiter 720 may be configured to, if enabled by the enable signal, perform round-robin arbitration among the low priority queues 614 in a conventional manner. The low priority arbiter 720 may cause the selected low priority queue 614 to dequeue a low priority notification to the processor 620.

The programmable comparison element 730 may include comparison logic and a memory for storing one or more comparison values. The memory may be configured to store one programmable comparison value for each of the n low priority queues 614. Alternatively, the memory in the programmable comparison element 730 may contain a single programmable comparison value for use with all of the low priority queues 614. The comparison logic may be configured to compare a packet size (e.g., number of D cells) of the low priority notification output by the selected low priority queue 614 with a programmable comparison value. If the packet size of the low priority notification is larger than the comparison value, the comparison element 730 may determine the packet to be "large," and may be configured to output a control signal to the programmable delay element 740. The control signal may include an address of the selected low priority queue 614 that dequeued the low priority notification.

The programmable delay element 740 may include programmable logic circuitry to generate a delay signal in response to the control signal from the programmable comparison element 730. In an implementation consistent with the present invention, the programmable delay element 740 may include one or more counters (e.g., a clocked shift register) having a delay length(s) that may be programmably selected. In one implementation consistent with principles of the invention, the programmable delay element 740 may generate n separate, programmable delay values for each of the n low priority queues 614. In an alternate embodiment, the programmable delay element 740 may generate a single programmable delay value for all of the n low priority queues 614. The programmable delay element 740 may also be configured to output a delay signal to the mask register 750 for the duration of the delay.

The mask register 750 may include logic that may be enabled by the delay signal from the delay element 740 to force an element of the low priority arbiter 720 to be zero (i.e., to "mask" that element of the low priority arbiter 720) for the duration of the delay. In one implementation consistent with principles of the invention, the mask register 750 may mask only the element corresponding to the selected low priority queue 614 that dequeued the large low priority notification (e.g., by logically AND-ing the binary input from the selected low priority queue 614 to the low priority arbiter 720 with zero). The address of the masked element may be supplied by the comparison element 730. In an alternate implementation consistent with principles of the invention, the mask register 750 may mask more than one, up to and including all, of the elements of low priority queue 720 for the duration of the delay.

Returning to FIG. 6, the head queue 610 may dequeue a selected notification to the processor 620 every two clock cycles. The processor 620 may include a FIFO queue for receiving notifications, a reader for retrieving D cell data from the memory system 240, and a buffer for buffering the D cells prior to transmittal (not shown). The processor 620 may process notifications one at a time, and may have a predetermined capacity (e.g., number of D cells corresponding to the notifications in its queue) before it is "full." The processor 620 may send completed packets to the L units 232 and 234 or the switch fabric 130.

The flow control logic 630 may include logic gates or programmable logic to monitor a packet size (e.g., number of D cells) of the notifications output by the head queue 610 to the processor 620. The flow control logic 630 may have an associated "fullness" threshold for how many D cells that the processor 620 may have associated with its queue of notifications. If this fullness threshold is exceeded, the flow control logic 630 may be configured to send a flow control signal to the head queue 610 to halt the flow of notifications from the head queue 610 to the processor 620. The flow control logic 630 may have an associated latency of, for example, 10–20 clock cycles from the time that its fullness threshold is exceeded to the time when it prevents the head queue 610 from sending further notifications to the processor 620.

Exemplary Network Device Processing

Figure 8:
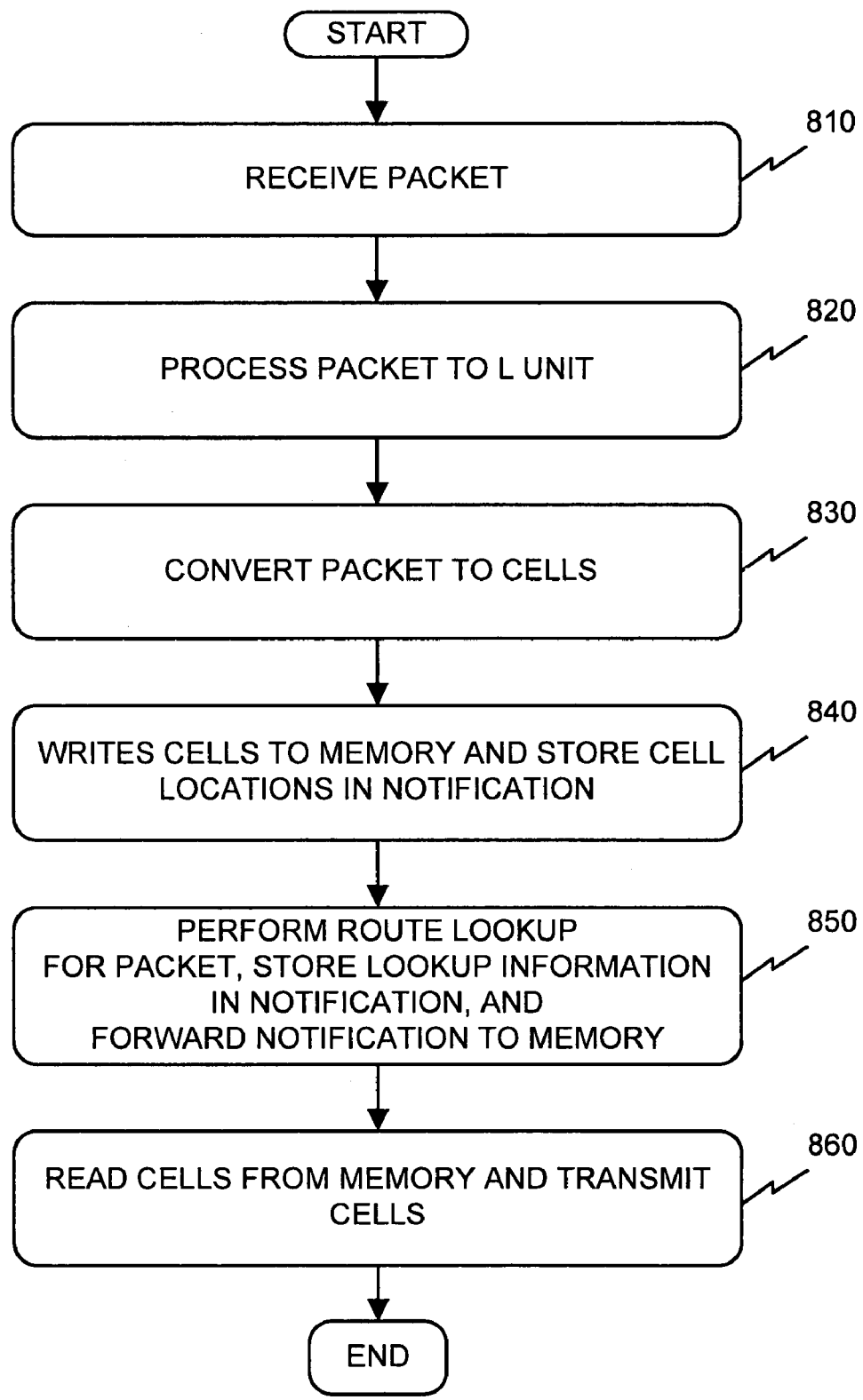
FIGS. 8 and 9 are flowcharts of exemplary processing of a packet by the network device of FIG. 1 according to an implementation consistent with the principles of invention.
Figure 9:
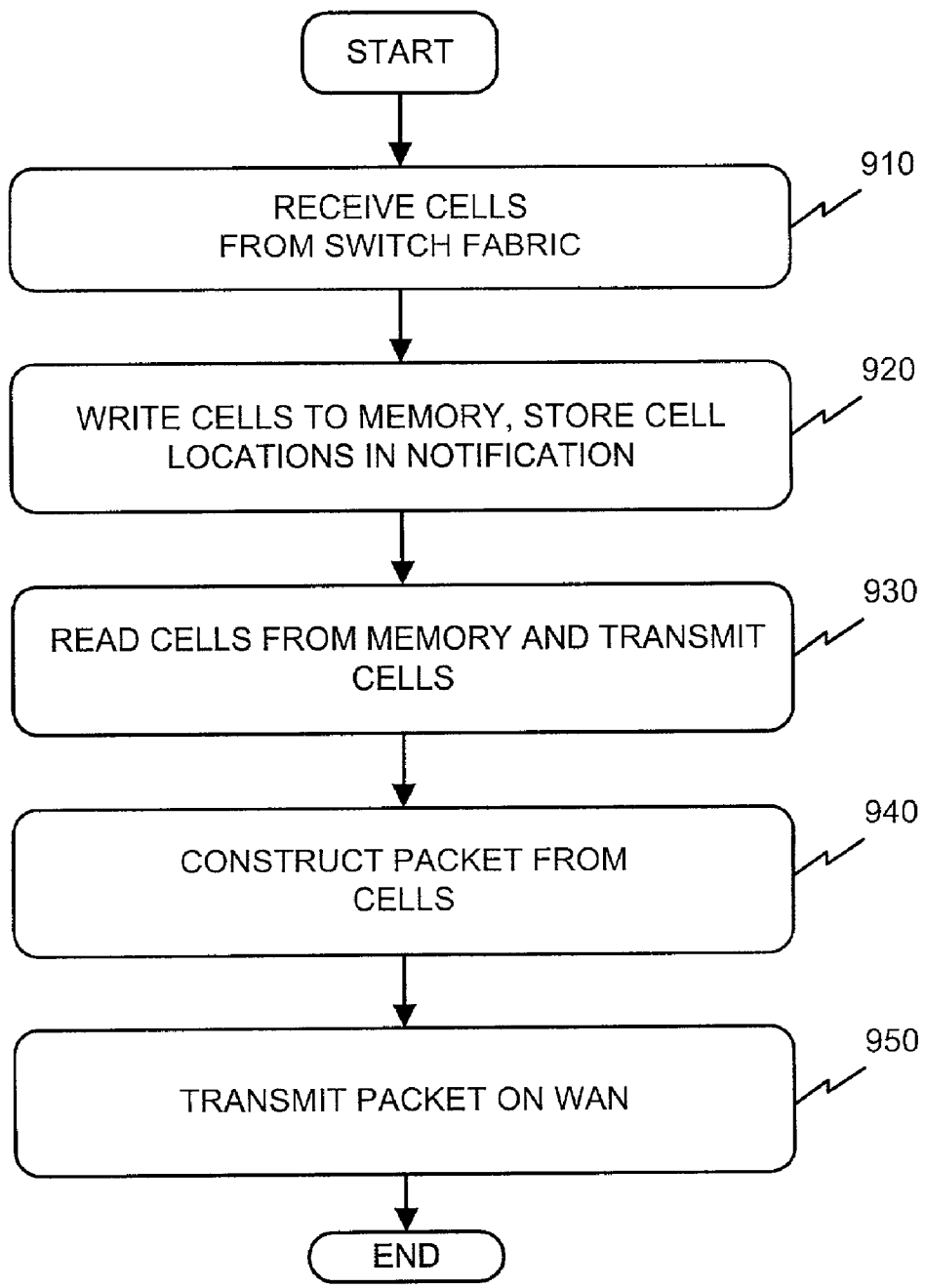

FIGS. 8 and 9 are flowcharts of exemplary processing of a packet, such as processing of a packet by the network device 100 of FIG. 1 according to an implementation consistent with the present invention. Processing may begin with receiving a packet over a transmission medium, such as a WAN [act 810]. The packet may be one of several packets in a stream of packets transmitted between a source and a destination. The packet may be processed [act 820]. For example, the layer 1 (L1) protocol information may be stripped off.

The packet is then converted into cells [act 830]. For example, the data of the packet may be divided into units of fixed size, such as 64 bytes, for storing in the cells. The L unit 232 may also process the header of the packet, such as the layer 2 (L2) and layer 3 (L3) headers, and store L2 and L3 header information and the processing results in the D cells. Further, the L unit 232 might create control information based on the packet. The L unit 232 may also store the control information in the D cells that it sends to the first I/O logic 236.

The cells containing packet data may then be written into memory [act 840]. The cells may be stored in non-contiguous locations and their location identified as a function of their relationship (offset) to location of the first D cell in the memory. The address offsets may be stored in a notification [act 840]. If there are more address offsets than will fit in the notification, these additional offsets may be stored in an address cell memory.

A route lookup for the packet may be performed based on routing table(s) [act 850]. For example, the routing table(s) may be analyzed using information in the notification to identify a PIC from which the packet is to be transmitted. Lookup information based on the route lookup may be stored in the notification [act 850]. The notification may then be forwarded to memory [act 850].

Returning to the system of FIG. 1, assume, for example, that the packet is received by a PIC connected to a first PFE 120 and is intended for a PIC of another PFE 120. In this case, the second I/O logic 238 reads the D cells and notification from the memory system 240 and transmits them to the switch fabric 130. The second I/O logic 238 may use the data cell addresses 440 (FIG. 4) in the notification to read the D cells from the memory system 240. The switch fabric 130 transmits the D cells and the notification to another PFE 120 (hereinafter "receiving PFE").

FIG. 9 illustrates a process of receiving cells from a switch fabric, such as switch fabric 50. The data cells are received from the switch fabric 130 [act 910] (FIG. 9). The D cells are written to memory. The D cells may be stored in non-contiguous locations in the memory. The addresses of the D cells as a function of their relationship (offset) to the memory location of the first D cell for the packet. The address offsets may be stored in the notification [act 920].

The D cells are later read from the memory and transmitted [act 930]. The data cell addresses in the notification may be used to read the D cells from the memory. Updated notification information may be stored in the D cells.

A packet may then be constructed from the D cells and the notification [act 940]. For example, in the system illustrated in FIG. 2, the L unit 234 may extract the notification, control information, and packet data from the D cells and create a packet therefrom. The L unit 234 may construct a packet header, such as L2 and/or L3 headers, from the notification and control information and load the packet data portion with the packet data in the D cells.

The packet may then be transmitted on a transmission medium, such as a WAN [act 950]. The packet may also be encapsulated in L1 protocol information before sending the packet out on the WAN.

Exemplary Output Logic Processing

Figure 10:
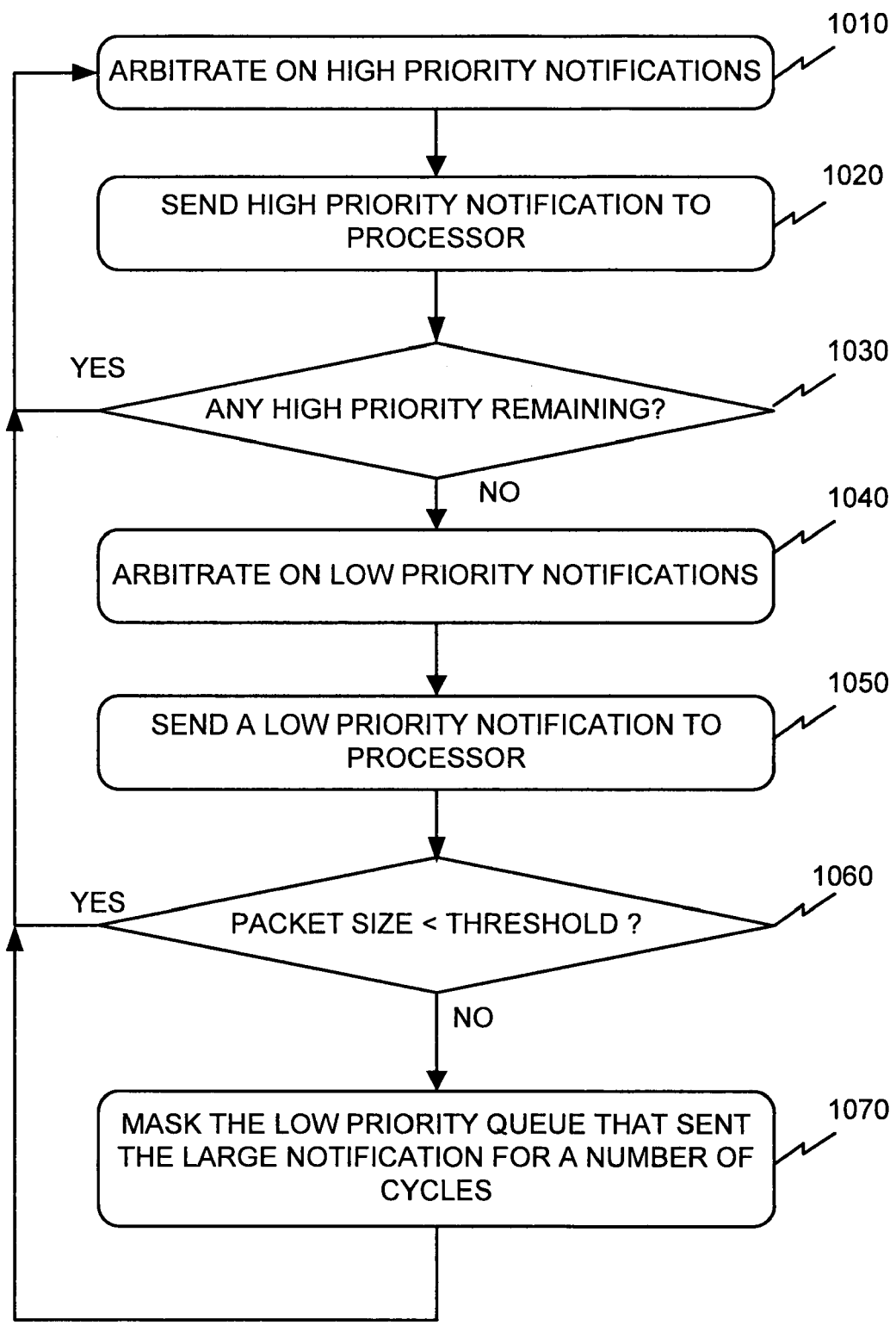
FIG. 10 is a flowchart of exemplary processing of packets by the output logic of FIG. 6 according to an implementation consistent with the principles of invention.

FIG. 10 is a flowchart of exemplary processing of a notification which may be performed by a notification processing system, such as by the head queue 610 of the output logic 520 according to an implementation consistent with the present invention. Processing may begin with performing arbitration on high priority notifications in high priority queues [act 1010]. For example, the high priority arbitration may select a high priority queue using conventional round-robin processing. The selected high priority queue may then send a high priority notification to a processor for processing [act 1020]. If, however, there are no high priority notifications in the high priority queues, then no notifications will be sent during act 1020.

If there are any high priority notifications remaining in the high priority queues arbitration may then be performed again on the remaining high-priority notifications [acts 1030 and 1010]. Alternately, act 1030 may be combined with act 1010.

If no high priority notifications remain in the high priority queues, arbitration may then proceed on the low priority notifications in the low priority queues [act 1040]. For example, the low priority arbitration may select any low priority queue that contains a notification by conventional round-robin processing. The selected low priority queue may then send a low priority notification to a processor for processing [act 1050].

The packet size (e.g., the number of associated D cells) of the low priority notification sent to the processor may be compared with a programmable threshold value [act 1060]. The threshold value may, for example, be related to a processing rate of the processor. The comparison act may use a single programmable threshold value, or it may use contain n separate, programmable threshold values (i.e., one per stream). If the packet size of the low priority notification is less than the threshold value, the high priority arbitration may again be performed for the high priority notifications [acts 1010–1030]. Processing continues from that point, as described above.

If, however, the packet size of the low priority notification is greater than (or equal to) the threshold value, the low priority queue that sent the "large" low priority notification is masked out of future arbitrations for a period of time or a number of cycles [act 1070]. For example, a mask register may be used to force an appropriate element to be zero for a delay period that is determined by a programmable delay element. A single programmable delay may be imposed for all of the low priority queues, or it may produce n separate programmable delays (i.e., one per stream). A delay related to the latency of certain logic, such as the flow control logic 630 (e.g., 10–20 clock cycles or 5–10 clock cycles) may also be used. The programmable delay alternately may be a delay related to the time that a processor will take to process the large low priority notification (e.g., from 1–20 clock cycles).

In an implementation consistent with the present invention, the mask register 750 may mask more than one of the low priority queues 614 at a time. For example, if a first low priority queue 614 is masked because of a low priority large packet, a second low priority queue 614 may be subsequently masked because of another low priority large packet during the delay period of the first low priority queue 614. In such a situation, two or more low priority queues 614 may be masked at the same time. In an alternate implementation consistent with the present invention, the mask register 750 may mask all of the low priority queues 614 concurrently. After a short delay period, for example, all but one or two of the low priority queues 614 may be unmasked. The remaining one or two of the low priority queues 614 may be unmasked after a longer delay period. Those skilled in the art will appreciate that various configurations of the programmable comparison element 730, the programmable delay element 740, and the mask register 750 are possible in accordance with the present invention. Such configurations should preferably be designed to avoid the blocking of high priority notifications by low priority notifications, while maintaining an acceptable throughput by the processor 620.

CONCLUSION

Systems and methods consistent with the present invention provide arbitration to avoid the blocking of high priority data by low priority data in a network device. The network device checks a size of a low priority packet when the low priority packet is dequeued for processing by a processor. If the low priority packet is larger than a programmable threshold, the network device may not dequeue any more low priority packets from the queue for processing for a programmable duration. The programmable threshold may depend on a processing rate of the processor, and the programmable duration may depend on a latency of a flow control device for the processor.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, systems and methods have been described as having different elements, such as the arbiters 710/720, the comparison element 730, the delay element 740, and the mask register 750. The functionality of any combination of these elements, or other elements previously described, may be combined into, for example, a programmable gate array or other processing device.

Although the principles of the invention have been described in terms of processing notifications corresponding to packets and arbitrating from high and low priority queues, other implementations may also use the principles of the invention. For example, instead of processing notifications, packets could be processed directly, or some representation of a packet other than a notification could be used. Priorities other than high and low priority could be also used. For example, data could be divided into more than two priority levels. Data transfer units other than packets could be used. For example, the invention could be implemented using any known data unit. Systems and methods consistent with the principles of the invention provide minimization of blocking in a data transfer system.

The scope of the invention is defined by the claims and their equivalents.

What is claimed is:

1. A system for managing flow of data in a network device, comprising:
   a plurality of high priority queues configured to store data unit information;
   a plurality of low priority queues configured to store data unit information; and
   an arbiter configured to selectively bypass a low priority queue based on a size of a data unit in the low priority queue, wherein the arbiter includes:
      a comparison element configured to compare a size of a data unit with one or more thresholds and to output one or more control signals based on the comparison, wherein the one or more thresholds of the comparison element is based on a processing rate of a processor.

2. The system of claim 1, wherein the arbiter includes:
   a high priority arbiter configured to perform arbitration on a plurality of high priority queues, and
   a low priority arbiter configured to perform arbitration on a plurality of low priority queues when enabled.

3. The system of claim 2, wherein the low priority arbiter is enabled when none of the plurality of high priority queues contains a notification.

4. The system of claim 2, wherein the high priority arbiter and the low priority arbiter are each configured to perform round-robin arbitration on their respective queues.

5. The system of claim 1, further comprising:
   a flow control device coupled to the arbiter and configured to determine a size of data units and to provide a flow control signal when the size exceeds a threshold,
   wherein the flow control device has an associated latency.

6. The system of claim 5, wherein a duration of the flow control signal is based on the latency of the flow control device.

7. A method for managing flow of data in a network device, comprising:
   selecting high priority data units from at least one of a plurality of high priority queues;
   selecting a low priority data unit from a low priority queue of a plurality of low priority queues if no high priority data units can be selected;
   comparing a size of the selected low priority data unit with a threshold; and
   removing the low priority queue from arbitration for a programmable duration when the low priority data unit size exceeds the threshold.

8. The method of claim 7, wherein each of said selecting acts includes:
   performing arbitration.

9. The method of claim 7, wherein the threshold relates to rate of processing by a processor.

10. A system for managing data flow in a network device, comprising:
    a plurality of high priority queues configured to store notifications corresponding to the high priority packets;
    a plurality of low priority queues configured to store notifications corresponding to the low priority packets;
    a high priority arbiter configured to perform arbitration on the plurality of high priority queues and to select a notification;
    a low priority arbiter configured to perform arbitration on the plurality of low priority queues and to select a notification when no notifications are present in the plurality of high priority queues;
    circuitry configured to compare a data unit size associated with the selected notification with a threshold, and to remove the low priority queue that contained the selected notification from further arbitration for a programmable duration when the data unit size exceeds the threshold; and
    a processor configured to receive the selected notifications and to assemble output data based on the selected notifications.

11. The system of claim 10, further comprising:
    a flow control device coupled to the processor configured to provide a flow control signal when a size of data units associated with notifications being processed by the processor becomes too high,
    wherein the duration is based on a latency associated with processing by the flow control device.

12. The system of claim 10, wherein the threshold is based on a processing rate of the processor.

13. A method for processing high priority data units and low priority data units in a network device, comprising:
    performing arbitration on high priority notifications that correspond to the high priority data units and outputting selected high priority notifications to a processor until no high priority notifications remain;
    enabling arbitration on low priority notifications that correspond to the low priority data units;
    performing arbitration on the low priority notifications and outputting a selected low priority notification to the processor;
    comparing a data unit size associated with the selected low priority notification with a threshold; and
    excluding a queue that contained the selected low priority notification from subsequent arbitration for a duration when the data unit size exceeds the threshold.

14. The method of claim 13, further comprising:
    setting the threshold based on a processing rate of the processor.

15. The method of claim 13, further comprising:
    setting the duration based on a latency associated with controlling flow of notifications to the processor.

16. A system for managing flow of data in a network device, comprising:
    a plurality of high priority queues configured to store data unit information;
    a plurality of low priority queues configured to store data unit information; and
    an arbiter configured to selectively bypass a low priority queue based on a size of a data unit in the low priority queue, wherein the arbiter includes:
       a comparison element configured to compare a size of a data unit with one or more thresholds and to output one or more control signals based on the comparison,
       a delay element configured to produce one or more delay signals in response to the one or more control signals from the comparison element, and
       a mask register configured to prevent the low priority arbiter from selecting one or more low priority queues for a duration defined by the one or more delay signals.

17. The system of claim 16, wherein the one or more low priority queues prevented from being selected by the mask register include:
    a low priority queue associated with the data unit whose size was compared to the one or more thresholds.

* * * * *